May 3, 1949.
A. P. ADAMSON
2,469,190
ANGULAR MOTION TRANSMITTING APPARATUS
Filed May 1, 1948
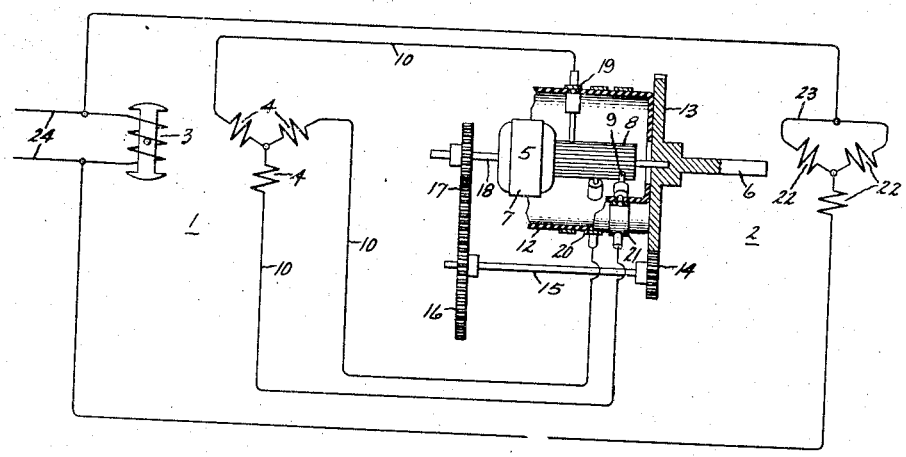
Inventor:
Arthur P. Adamson,
by  *Cauh H. Mitt.*
His Attorney.

Patented May 3, 1949

2,469,190

UNITED STATES PATENT OFFICE 2,469,190

ANGULAR MOTION TRANSMITTING APPARATUS

Arthur P. Adamson, Ballston Spa, N. Y., assignor to General Electric Company, a corporation of New York Application May 1, 1948, Serial No. 24,662

7 Claims. (Cl. 318—24)

The present invention relates to angular motion transmitting apparatus and more particularly to angular motion transmitting apparatus of an electrical type involving transmitter and receiver units known in the art as Selsyns.

In my copending application Serial No. 17,453, filed March 27, 1948, now Patent 2,458,921, issued January 11, 1949, I described Selsyn angular motion transmitting systems of a type wherein the receiver Selsyn develops higher torque than previously possible with transmitter and receiver Selsyns of comparable size and cost. In that application there was described particular means for producing a damping action in the rotor Selsyn tending to prevent overshooting or hunting about the synchronous position. This damping action was shown to be obtainable by short-circuiting quadrature or adjacent brushes disposed about the commutator of the receiver rotor. This arrangement, however, is subject to the disadvantage that substantial short-circuit currents flow between the bridged brushes resulting in certain inefficiencies of receiver rotor operation.

An object of the present invention is to provide improved angular motion transmitting apparatus of the type similar to that described in my above mentioned copending application and further comprising a novel arrangement for producing improved damping action.

A further object of my invention is to provide novel angular motion receiving apparatus which develops both a high torque and a high damping action without any substantial increase in the copper loss of the receiver rotor.

The invention will be more fully understood by referring now to the accompanying schematic drawing of a Selsyn system constructed in accordance with my invention comprising a Selsyn transmitter indicated generally as 1 and a Selsyn receiver indicated generally as 2. The Selsyn transmitter 1 which may be of conventional construction is shown as comprising a rotor having a winding 3 provided with single phase connections and a stator having polyphase winding 4 provided with polyphase connections. The magnetic fields of the transmitter stator and rotor are relatively rotatable.

The Selsyn receiver is shown as comprising a rotor member 5 which is rotatably secured to a load shaft 6, the shaft being rotatably mounted on fixed bearing supports, not shown. The rotor member 5 is provided with a conventional wave winding 7 which is connected to a commutator 8. The commutator 8 is engaged by polyphase brushes 9 displaced 120° apart which provide polyphase connections for conducting current from the transmitter Selsyn windings 4 via conductors 10. The brushes 9 are mounted on a rotatable insulating support 12 secured to a gear 13 forming a part of the shaft 6. The gear 13 meshes with a pinion 14 carried on a shaft 15, the shaft also carrying a gear 16 which meshes with a pinion 17 carried by the rotor shaft 18. One end of the rotor shaft 18 is mounted for free rotation in a socket forming a part of the hub of the gear 13 and the other end of the shaft 18 may be rotatably mounted in a fixed bearing support, not shown. Slip rings 19, 20 and 21 carried by the rotatable brush support 12 are provided for conducting current between conductors 10 and commutator 8 without restricting rotation of the load shaft 6.

The receiver Selsyn is provided with a magnetic field by windings 22 which are Y connected 120° apart. Two of the windings are short-circuited by a conductor 23 thus providing in effect a shorted quadrature winding. The third or unshorted winding 22 is connected to one terminal of the Selsyn transmitting rotor 3 while short-circuited conductor 23 is connected to the other terminal of Selsyn transmitter rotor 3, rotor 3 being supplied from a periodically varying source 24.

In operation, current flows from source 24 to the transmitter Selsyn winding 3 producing an alternating magnetic flux linking the stator windings 4 and inducing currents therein. These currents also flow through the windings 22 which produce a magnetic field, the axis of which varies in direction in accordance with the angular position of the transmitter Selsyn rotor 3 and also in accordance with the angular position of the rotatable stator member 5 of the receiver Selsyn relative to a fixed support. As long as the axes of the rotor and stator magnetic fields of the receiver Selsyn are in correspondence, the rotor 5 remains stationary and the load shaft 6 occupies an angular position bearing the predetermined relation to the angular position of the transmitting Selsyn rotor.

Now if the rotor of the transmitter Selsyn is displaced by an angle, say 5°, the axis of the stator field of the receiver Selsyn is also immediately displaced 5° relative to the axis of the field produced by the receiver rotor winding 7. This causes rotation of the receiver rotor 5 which in turn drives the brushes 9 through the gear reduction. This action continues until the brushes 9 have rotated 5° at which point the receiver rotor magnetic field again becomes aligned with the receiver stator magnetic field and the rotation of the receiver rotor 5 stops. Therefore, it will be apparent that the receiver rotor member 5 and the load shaft 6 are always maintained in angular correspondence with the rotor of transmitter Selsyn 1. Because of the arrangement utilizing the commutated receiver rotor winding in a gear reduction interconnecting the receiver rotor and the brushes of the receiver Selsyn, it is possible to obtain any desired torque output from the load shaft 6 by suitably selecting the gear ratio, or speed ratio if other driving means are used, between the rotor shaft 18 and the load shaft 6 without sacrificing any appreciable reduction in the accuracy of the angular correspondence between the transmitter and receiver units.

In order to prevent overshooting or hunting about the synchronous position due to the energy developed by the receiver rotor as it spins to a new position, previous systems have utilized short-circuited quadrature brush arrangements about the rotor commutator calculated to provide a strong damping action by causing a heavy generator current to flow through the short circuit whenever the receiver Selsyn has a substantial velocity about the synchronous position. However, while such an arrangement quickly deprives the rotor of its extra synchronizing energy, a large power loss results due to the heavy short-circuit current. This power is dissipated in the rotor and creates a temperature increase in the rotor winding. Now I have discovered that the brushes can be relieved from carrying such heavy short-circuit currents without loss of the original damping action by the simple expedient of short circuiting two of the polyphase legs of the receiver stator windings. This decreases the quadrature reactance because of the short circuit presented to quadrature axis current in the receiver stator windings and causes any oscillation to damp out very rapidly. This short circuit is effected in the stator winding which is the outermost winding of the receiver and is thus exposed to more favorable cooling conditions. Wear and tear at the brushes due to short-circuit current arcing is materially reduced, and operating efficiency is improved owing to the consequent reduction in the operating temperature in the receiver rotor. Thus, it will be evident that the prior disadvantages are not merely transferred from the receiver stator to the receiver rotor but that definite over-all advantages are attained which constitute a distinct improvement in the Selsyn art. It will also be seen that as a result of decreasing the quadrature reactance due to the short circuit presented to quadrature axis current in the receiver stator, that the torque gradient at correspondence is also increased.

From the foregoing discussion, it will be appreciated that an important feature of my invention lies in providing a receiver having an effective shorted quadrature winding together with an unshorted winding. Such an arrangement may be achieved in any manner known in the art as, for example, by providing a receiver having simply a two phase winding, one of which is excited by the applied alternating voltage and the other of which is short circuited.

It will be understood that the receiving Selsyn arrangement above described may be used independently with other known forms of transmitting Selsyn arrangements. For this reason, I have merely illustrated the transmitter stator schematically which in practice may comprise, for example, a continuous toroidal winding having three equally spaced taps connected to conductors 10. Such an arrangement is commonly used where the supply source is D.-C. and the Selsyn transmitter is excited with D.-C. through opposite rotatable brushes. Where the transmitter Selsyn supply is D.-C., of course, the receiver Selsyn is also supplied with D.-C. Similarly, where the transmitter Selsyn supply is A.-C., the receiver Selsyn is supplied with A.-C.

While the invention has been set forth with particularity, it will be apparent to those familiar with the art that various modifications may be made without departing from the invention, and therefore the appended claims are intended to encompass such modifications as fall within the true spirit and scope of the invention.

I claim:

1. An electromotive device comprising a stator member having polyphase windings with two of the phases short circuited, a rotor member having a winding thereon connected to a commutator, a plurality of brushes engaging said commutator, means comprising a rotatable member connected to rotate said brushes relative to said stator member and mechanical driving means interconnecting said rotor and rotatable member.

2. An electromotive device comprising a stator member having polyphase windings, at least one of said windings being short circuited so as to decrease the reactance presented to quadrature axis currents, a cooperating rotor member having a winding connected to a commutator, polyphase brushes engaging said commutator for conducting current to said rotor winding, means comprising a rotor member for effecting relative rotation of the axes of the magnetic field produced by said stator and rotor windings and mechanical driving means interconnecting said rotor and rotatable member.

3. A motion transmitting system of the self-synchronous type comprising a transmitter unit having a winding provided with a single phase connection adapted to be energized from a source of periodically varying current and a relatively rotatable winding having polyphase connections, a receiver unit having a stator member and a rotor member each having polyphase windings associated therewith, the polyphase windings of one of said receiver members being connected to that transmitter winding having polyphase connections, at least one of the windings of the other of said receiver members being short circuited, connections for energizing the windings of said other receiver member from said source of periodically varying current, the winding associated with the receiver rotor being a commutated winding to which current is conducted through brushes, synchronizing means comprising a mechanically rotatable member for effecting relative rotation of the axes of the magnetic fields produced by the receiver stator and rotor windings, and means for connecting said rotatable member to be driven by the receiver rotor at a speed such that the relative rotation of said axes occurs at a speed different from the angular speed of said receiver rotor.

4. A receiver unit for a motion transmitting system adapted to be connected to an electrical motion transmitter of the type having a winding provided with a single phase connection connected to a source of periodically varying current and a relatively rotatable winding having polyphase connections, said receiver unit comprising a stator member and a rotor member each having polyphase windings associated therewith, the polyphase windings of one of said receiver members being connected to that transmitter winding having polyphase connections, two of the windings of the other of said receiver members being short circuited, connections for energizing the windings of said other receiver member from said source of periodically varying current, the winding associated with the receiver rotor being a commutated winding to which current is conducted through brushes, means comprising a rotatable member for effecting relative rotation of the axes of the magnetic fields produced by the receiver stator and rotor windings, and means for connecting said rotatable member to be driven by the receiver rotor at a speed such that the relative rotation of said magnetic field axes occurs at a speed different from the angular speed of said receiver rotor.

5. A Selsyn angular motion transmitting system comprising a transmitter Selsyn having rotor and stator members with windings thereon one of which has single phase connections and the other having polyphase connections, a receiver Selsyn having rotor and stator members, said receiver stator having polyphase windings thereon, at least one of said windings being short circuited so as to decrease the reactance presented to quadrature axis currents, said receiver Selsyn rotor member having polyphase windings thereon connected to a commutator engaged by brushes, means for rotating said brushes relative to the receiver Selsyn stator member, means for connecting the winding of said polyphase transmitter Selsyn to said brushes, means for connecting said receiver stator windings to a source of periodically varying current, and means for drivably connecting said receiver Selsyn rotor member to said brush rotating means through a speed reduction device whereby said receiver Selsyn brushes are slowly driven with a high torque output to angular correspondence with the rotor member of said transmitting Selsyn.

6. A motion transmitting system of the self-synchronous type comprising a transmitter unit having a winding provided with single phase connections adapted to be energized from a source of periodically varying current and a relatively rotatable winding having polyphase connections, a receiver unit having a stator member and a rotor member each having polyphase windings associated therewith, one of said receiver windings having polyphase connections connected to the transmitter winding having polyphase connections and the other receiver winding having at least one of its windings short circuited so as to decrease the reactance presented to quadrature axis currents, said other receiver winding being adapted to be energized from said source of periodically varying current, the winding associated with the receiver rotor being a commutated winding to which current is conducted through brushes, means comprising a rotatable member for effecting relative rotation of the axes of the magnetic fields produced by the receiver stator and rotor windings, and means for connecting said rotatable member to be driven by the receiver rotor at a speed such that the relative rotation of the axes occurs at a speed less than the angular speed of said receiver rotor.

7. A receiver unit for a motion transmitting system adapted to be connected to an electrical motion transmitter of the type having a winding provided with a single phase connection connected to a source of periodically varying current and a relatively rotatable winding having polyphase connections, said receiver unit comprising a stator member and a rotor member each having polyphase windings associated therewith, one of said receiver windings having polyphase connections adapted to be connected to the transmitter winding having polyphase connections and the other receiver winding having at least one of its windings short circuited so as to decrease the reactance presented to quadrature axis currents, and having single phase connections adapted to be connected to said source of periodically varying current, the winding associated with the receiver rotor being a commutated winding to which current is conducted through brushes, means comprising a rotatable member for effecting relative rotation of the axes of the magnetic fields produced by the receiver stator and rotor windings, and means for connecting said rotatable member to be driven by the receiver rotor at a speed such that the relative rotation of said axes occurs at a speed less than the angular speed of said receiver rotor.

ARTHUR P. ADAMSON.

No references cited.